(12) United States Patent
Mitchell et al.

(10) Patent No.: US 7,334,804 B2
(45) Date of Patent: Feb. 26, 2008

(54) PORTABLE TIRE AND WHEEL LIFTING APPARATUS

(76) Inventors: Knecole A. Mitchell, 1701 Stanfiel St., Chattanooga, TN (US) 37406; Tyler Russell, III, 3103 Mary Walker Pl., Chattanooga, TN (US) 37411

( * ) Notice: Subject to any disclaimer, the term of this patent is extended or adjusted under 35 U.S.C. 154(b) by 0 days.

(21) Appl. No.: 10/800,248

(22) Filed: Mar. 12, 2004

(65) Prior Publication Data

US 2005/0200091 A1    Sep. 15, 2005

(51) Int. Cl.
   *B62B 3/02*    (2006.01)
(52) U.S. Cl. .................................. 280/79.4; 280/79.11
(58) Field of Classification Search ............... 280/79.4, 280/79.11; 254/88, 122; 414/426–429
   See application file for complete search history.

(56) References Cited

U.S. PATENT DOCUMENTS

| | | | | |
|---|---|---|---|---|
| 1,964,119 A | * | 6/1934 | Hendry ........................ | 414/427 |
| 2,570,587 A | * | 10/1951 | Noone et al. ................ | 414/428 |
| 2,852,151 A | * | 9/1958 | Smith .......................... | 414/428 |
| 3,145,859 A | * | 8/1964 | Barosko ...................... | 414/427 |
| 3,292,902 A | * | 12/1966 | Lynch ......................... | 254/122 |
| 3,378,154 A | * | 4/1968 | Mousel ....................... | 414/428 |
| 3,598,366 A | * | 8/1971 | Juds ............................ | 254/2 B |
| 4,050,597 A | | 9/1977 | Hawkins | |
| 4,343,379 A | * | 8/1982 | Haulotte ..................... | 187/244 |
| 4,401,405 A | * | 8/1983 | Ealet .......................... | 414/428 |
| 4,460,306 A | * | 7/1984 | Hawkins ..................... | 414/427 |
| 4,526,346 A | * | 7/1985 | Galloway et al. ........... | 254/122 |
| 4,558,847 A | * | 12/1985 | Coates ........................ | 254/9 C |
| 4,571,142 A | * | 2/1986 | Niewald et al. ............. | 414/427 |
| 4,659,066 A | * | 4/1987 | VanLierop ................... | 254/122 |
| 4,690,605 A | * | 9/1987 | Coccaro ...................... | 414/429 |
| 4,696,484 A | * | 9/1987 | Casey ......................... | 280/43.16 |
| 4,771,531 A | | 9/1988 | Asher | |
| 4,822,004 A | * | 4/1989 | Van Lierop ................. | 254/122 |
| 4,899,987 A | * | 2/1990 | Craig .......................... | 254/122 |
| 4,901,980 A | * | 2/1990 | Hansen ....................... | 254/9 C |
| 5,007,789 A | | 4/1991 | Painter | |
| 5,139,110 A | * | 8/1992 | Kishi .......................... | 187/244 |
| 5,348,438 A | | 9/1994 | Roberts | |
| 5,476,050 A | * | 12/1995 | Zimmer et al. ............. | 108/145 |
| 5,503,368 A | * | 4/1996 | Torres ......................... | 254/88 |
| 5,505,578 A | | 4/1996 | Fuller | |
| 5,525,019 A | * | 6/1996 | Moore et al. ............... | 414/347 |
| 5,702,226 A | | 12/1997 | Pickle | |

(Continued)

Primary Examiner—Christopher P. Ellis
Assistant Examiner—Vaughn Coolman
(74) Attorney, Agent, or Firm—Dale J. Ream

(57) ABSTRACT

A portable tire and wheel lifting apparatus includes a base, a pair of lifting arms pivotally coupled in a scissor configuration, pneumatic cylinders, an air input device, and an air outlet valve. In use, a tire and wheel are smoothly rolled from the ground to the lifting arms, which are in a retracted configuration. The air input device adds air to the pneumatic cylinders, causing the lifting arms to move from the retracted to an extended configuration, thus raising the tire and wheel. The tire and wheel are turned to line up the rim with the vehicle's hub and fastened to the vehicle. The air outlet valve selectively releases air from the pneumatic cylinders, allowing the lifting arms to move from the extended to the retracted configuration. The tire and wheel lifting apparatus is small enough to fit inside the cavern defined by a spare tire and wheel for storage.

4 Claims, 5 Drawing Sheets

U.S. PATENT DOCUMENTS

| | | | |
|---|---|---|---|
| 5,855,359 A * | 1/1999 | Chipperfield | 254/88 |
| 6,095,745 A | 8/2000 | Garnett | |
| 6,098,961 A * | 8/2000 | Gionet | 254/122 |
| 6,106,214 A | 8/2000 | Saffelle et al. | |
| 6,182,796 B1 * | 2/2001 | Perlstein et al. | 187/208 |
| 6,237,206 B1 * | 5/2001 | Bezemer et al. | 29/273 |
| 6,382,644 B1 * | 5/2002 | Rawlings | 280/79.4 |
| 6,679,479 B1 * | 1/2004 | Watkins | 254/9 C |
| 7,207,764 B1 * | 4/2007 | Snook | 414/427 |

* cited by examiner

PORTABLE TIRE AND WHEEL LIFTING APPARATUS

BACKGROUND OF THE INVENTION

This invention relates generally to tools that aid in mounting wheels and tires upon vehicles and, more particularly, to a portable tire and wheel lifting apparatus that assists in the lifting and placing of a tire and wheel combination onto an automobile.

Longer and longer average commuting distances mean more people will experience tire problems on the road. Although some can afford roadside service, for others this is beyond their means or simply unavailable. Further, some drivers take comfort in the knowledge that they can handle common maintenance tasks themselves.

A full size, inflated car tire can weigh over 30 pounds, and truck tires can weigh even more. This weight presents a problem for smaller individuals, the elderly, and others. A jack is commonly used to lift a car, but no comparable product exists to aid motorists in lifting the tire and placing it onto the car.

Devices for lifting vehicle wheels are known in the art, such as in U.S. Pat. No. 4,050,597, U.S. Pat. No. 4,771,531, U.S. Pat. No. 5,007,789, U.S. Pat. No. 5,505,578, U.S. Pat. No. 6,095,745, and U.S. Pat. No. 6,382,644, but are directed to lifting large vehicle wheels, are neither compact nor lightweight, cannot be conveniently stored in smaller vehicles, and thus do not aid motorists in changing a tire on a roadside. Further, many of these devices require arm strength to power the lifting means. This required arm strength is often problematic for smaller individuals, the elderly, and others.

Other devices for lifting vehicle wheels utilize the mechanical advantage provided by a simple lever, such as in U.S. Pat. No. 5,348,438 and U.S. Pat. No. 5,702,226. Since the rotational force gained from levers is in direct proportion to the distance between the fulcrum and the applied force, these devices are often too large to be conveniently stored in an automobile. Moreover, these devices are often difficult, cumbersome, or messy to use since an individual must keep his weight on the lever at all times while changing the tire.

Therefore, it is desirable to have a tire and wheel lifting device that is compact and lightweight, can be conveniently stored in smaller vehicles, does not require arm strength to power the lifting means, does not require the user to maintain his weight on the device, and allows rotation of the tire to match the holes of the rim with the vehicle's hub to aid motorists in changing a tire.

SUMMARY OF THE INVENTION

A portable tire and wheel lifting apparatus for use in changing an automobile tire according to the present invention includes a base, a pair of lifting arms pivotally coupled in a scissor configuration, pneumatic cylinders, an air input device, and an air outlet valve. When in use, the portable tire and wheel lifting apparatus is initially in a retracted configuration and placed on the ground near a vehicle's hub. A tire and wheel are then smoothly rolled from the ground to the lifting arms. The air input device adds air to the pneumatic cylinders, causing the lifting arms to move from the retracted configuration to an extended configuration, thus raising the tire and wheel to the desired height. The tire and wheel can then be turned until the holes of the rim line up with the vehicle's hub, allowing the tire and wheel to be fastened to the vehicle. After the tire and wheel are fastened to the vehicle, the air outlet valve may be actuated to selectively release air from the pneumatic cylinders, allowing the lifting arms to move from the extended configuration to the retracted configuration. The lifting arms may include support members or rollers to aid in supporting and rotating the tire and wheel. Further, the tire and wheel lifting apparatus is small enough to fit inside the cavern defined by a tire and wheel, allowing it to be stored in the automobile's spare tire and thus take up minimal cargo area.

Therefore, a general object of this invention is to provide a portable tire and wheel lifting apparatus that is compact and lightweight.

Another object of this invention is to provide a portable tire and wheel lifting apparatus, as aforesaid, that can be conveniently stored in smaller vehicles.

Still another object of this invention is to provide a portable tire and wheel lifting apparatus, as aforesaid, that does not require arm strength to power the lifting means.

Yet another object of this invention is to provide a portable tire and wheel lifting apparatus, as aforesaid, that does not require the user to maintain his weight on the device.

A further object of this invention is to provide a portable tire and wheel lifting apparatus, as aforesaid, that allows rotation of the tire to match the holes of the rim with the vehicle's hub.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
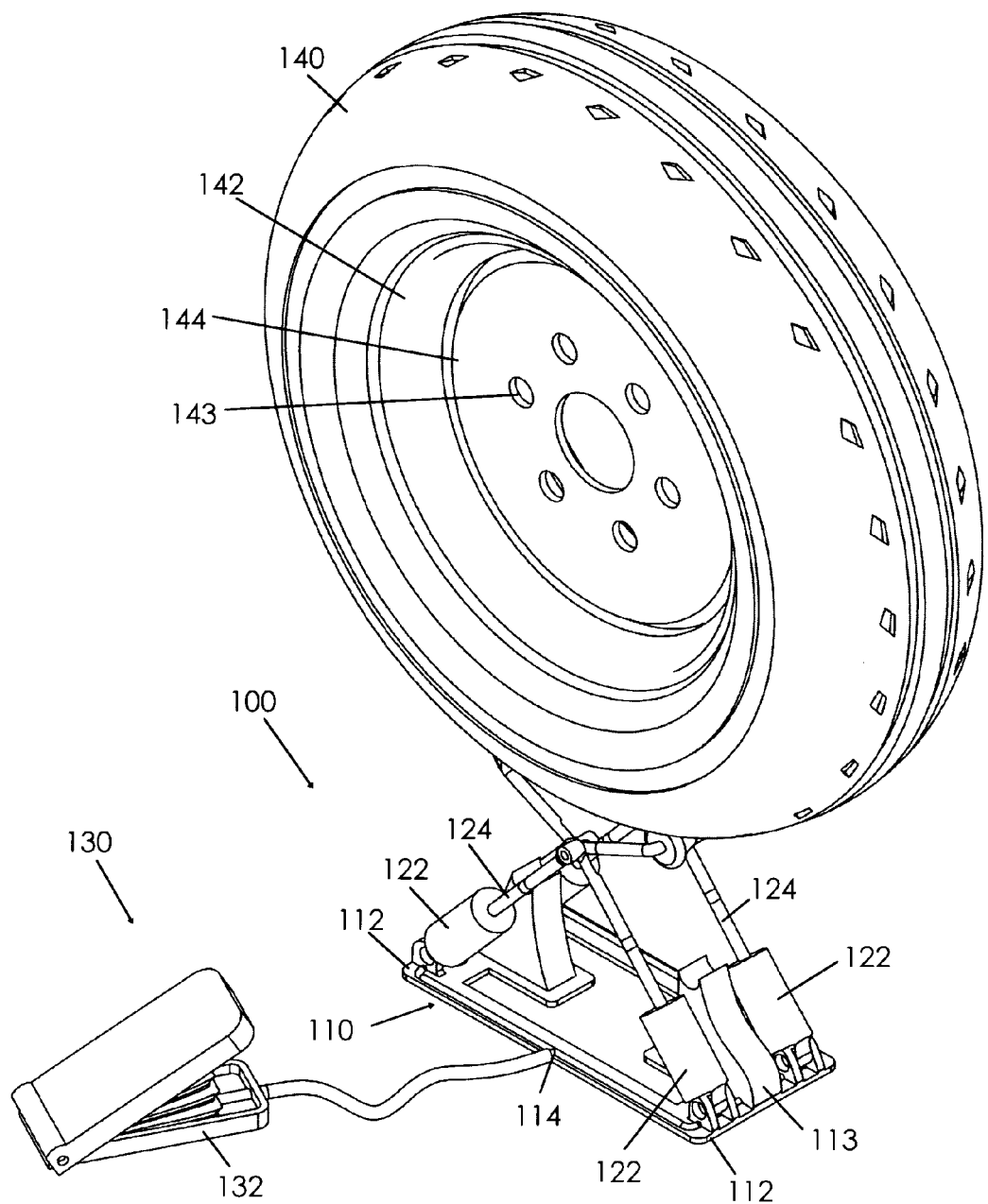
FIG. 1 is a front perspective view of a portable tire and wheel lifting apparatus in use with a tire and wheel according to a now preferred embodiment of the present invention.
Figure 2:
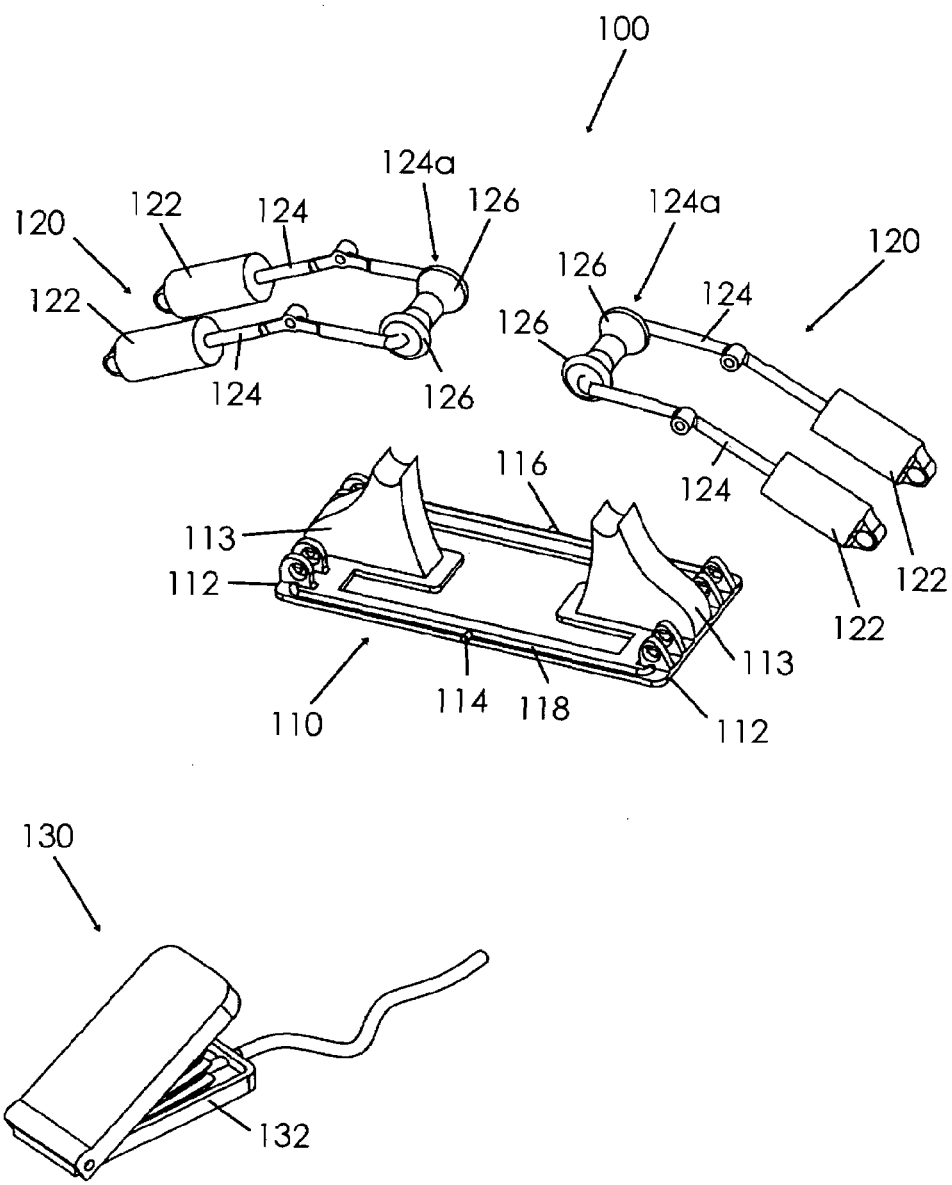
FIG. 2 is an exploded view of the portable tire and wheel lifting apparatus as in FIG. 1.
Figure 3A:
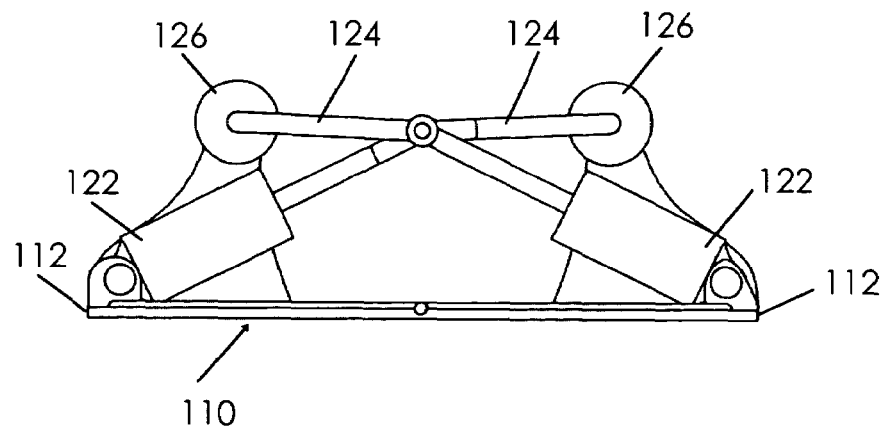
FIG. 3a is front view of the portable tire and wheel lifting apparatus as in FIG. 1 in a retracted configuration.
Figure 3B:
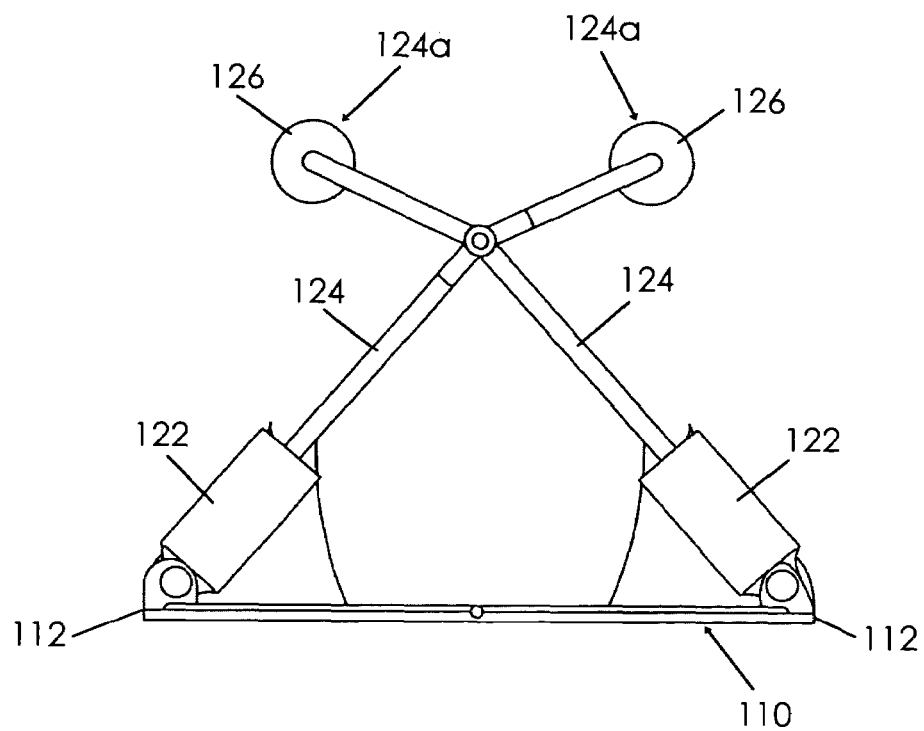
FIG. 3b is a front view of the portable tire and wheel lifting apparatus as in FIG. 1 in an extended configuration.

A portable tire and wheel lifting apparatus according to the present invention will now be described with reference to FIGS. 1 through 4 of the accompanying drawings. More particularly, a portable tire and wheel lifting apparatus 100 according to a now preferred embodiment includes a base 110 with opposed sides 112 and a pair of piston cylinder combinations 120. Each piston cylinder combination 120 has at least one pneumatic cylinder 122 and a lifting arm 124. The pneumatic cylinders 122 of the respective piston cylinder combinations 120 are pivotally coupled to the respective opposed sides 112 of the base 110. First/lower ends of the lifting arms 124 are received by respective cylinders 122 and extend therefrom and are pivotally coupled to one another, creating a scissor configuration that allows for relative up and down movement (FIGS. 3*a* and 3*b*). It is understood that each combination 120 may include a pair of cooperating cylinders 122 and arms 124 (FIG. 2). The top ends 124*a* of the lifting arms 124 are configured to support a tire 140 and wheel 142 thereon, and a pair of support members may be attached to the top ends 124*a* for better supporting the tire and wheel. The support members may be rollers as will be described later. The lifting arms 124 preferably have a lower segment angularly offset from an upper segment, allowing the portable tire and wheel lifting apparatus 100 to remain compact and provide ample room for the tire 140 and wheel 142 to be supported on the top ends 124*a* of the lifting arms 124. Rollers 126 are preferably rotatably mounted to the top ends 124*a* or the support members to allow the tire 140 and wheel 142 to rotate in order to match the holes 143 of the rim 144 with the vehicle's hub (not shown).

The base 110 preferably has ramp members 113 at the opposed sides 112 that allow a person to smoothly roll the tire 140 from a ground surface to the top ends 124*a* of the lifting arms 124. Further, the base 110 preferably includes an air inlet valve 114, an air outlet valve 116 (also known as a bleed screw,) and tubing 118 to connect the pneumatic cylinders 122 to the air inlet valve 114 and the air outlet valve 116 (FIG. 2).

An air input device 130 removably attaches to the air inlet valve 114. The air input device 130 is preferably either foot-operated, such as a foot pump 132 (also known as foot-operable bellows or a treadle,) and is connected to the air inlet valve 114 with tubing (FIG. 1). Of course, other air input devices such as a portable electric air compressor would also be suitable.

Figure 4:
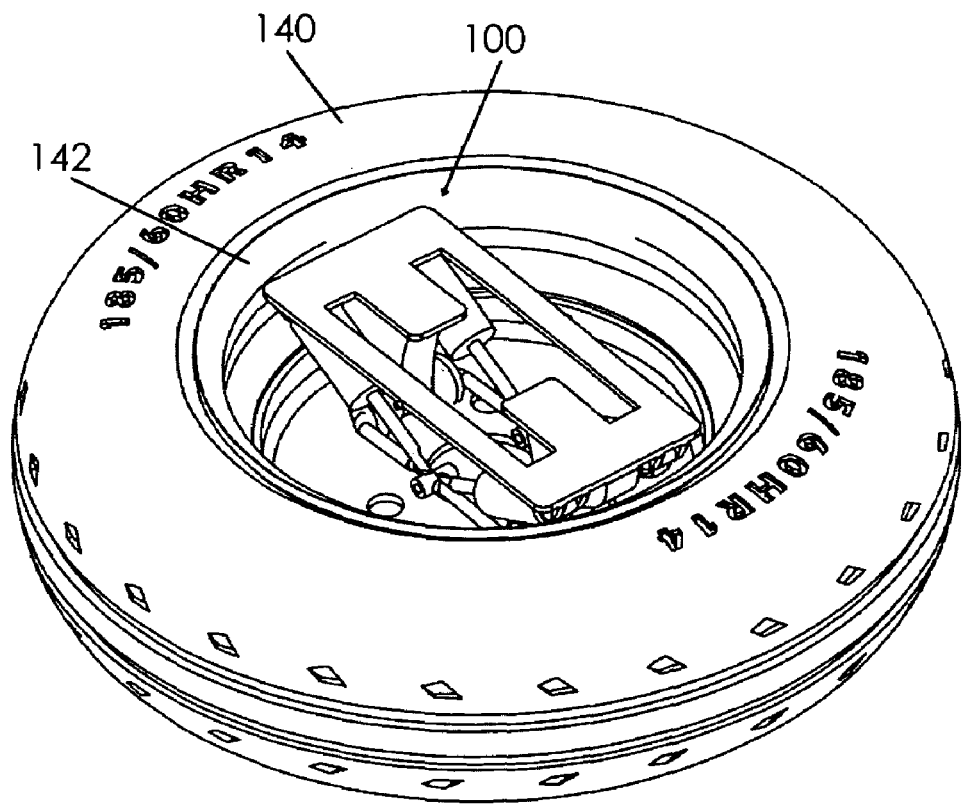
FIG. 4 is a front perspective view of the portable tire and wheel lifting apparatus as in FIG. 1 in a retracted configuration and located inside a tire for storage.

In use, the portable tire and wheel lifting apparatus 100 is initially in a retracted configuration (FIG. 3*a*) and placed on the ground near a vehicle's hub. The air input device 130 may then be attached to the air inlet valve 114. The tire 140 and wheel 142 may be smoothly rolled from the ground up ramp member 113 to the rollers 126 at the top ends 124*a* of the lifting arms 124. The air input device 130 may be operated to impart air through the air inlet valve 114, which is then introduced through the tubing 118 to the pneumatic cylinders 122. The additional air in the pneumatic cylinders 122 causes the lifting arms 124 to move from the retracted configuration to an extended configuration (FIG. 3*b*), thus raising the tire 140 and wheel 142 to the desired height. The tire 140 and wheel 142 may then be rotated until the holes 143 of the rim 144 line up with the vehicle's hub. The tire 140 and wheel 142 may then be pushed onto the vehicle's hub and fastened thereon. After the wheel 142 is attached to the vehicle's hub, the air outlet valve 116 may be actuated to release air from the pneumatic cylinders 122 and the tubing 118. The release of air from the cylinders allows the lifting arms 124 to move from the extended configuration to the retracted configuration. If the pneumatic cylinders 122 are spring return cylinders, the lifting arms 124 will return to the retracted configuration on their own with the loss of air. If the pneumatic cylinders 122 are not spring return cylinders, a force is needed to cause the lifting arms 124 to return to the retracted configuration. This could be accomplished by stepping on the top ends 124*a*. The air input device 130 may then detached from the air inlet valve 114, and the tire and wheel lifting apparatus 100 may be conveniently stored in the automobile. The tire and wheel lifting apparatus 100 is preferably small enough to fit inside the cavern defined by the tire 140 and wheel 142, allowing the tire and wheel lifting apparatus 100 to be stored in the automobile's spare tire and thus take up minimal cargo area (FIG. 4).

Figure 5:
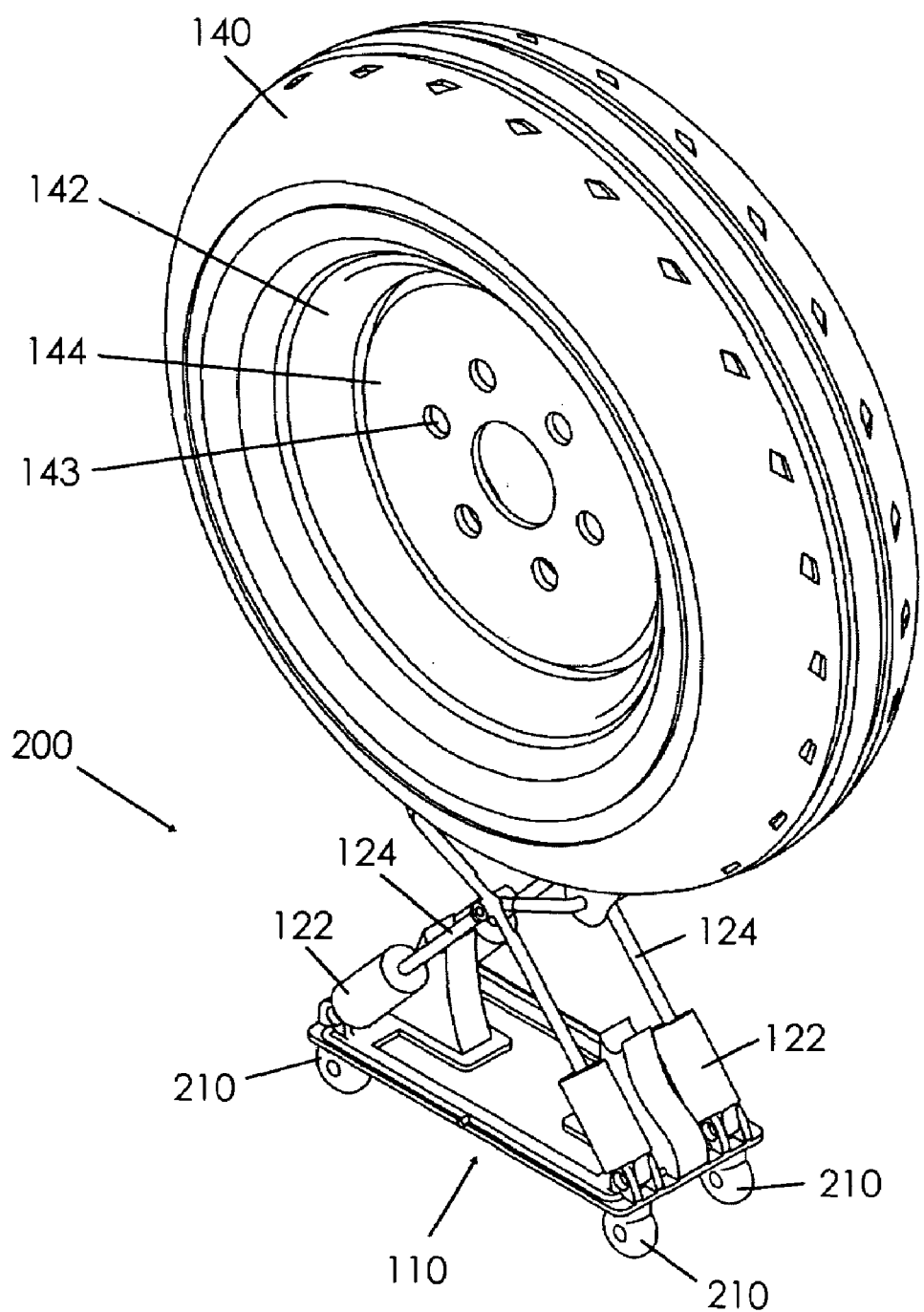
FIG. 5 is a front perspective view of a portable tire and wheel lifting apparatus according to another embodiment of the present invention.

A tire and wheel lifting apparatus 200 according to another embodiment of the present invention is shown in FIG. 5 and includes a construction substantially similar to the construction previously described except as specifically noted below. More particularly, the tire and wheel lifting apparatus 200 according to this embodiment includes a plurality of wheels 210 attached to the base 110 for allowing the base 110 to be easily moved along the ground. This may aid the user in moving the tire 140 and wheel 142 onto the vehicle's hub, where the wheel 142 can be fastened thereon. The wheels 210 may include locking mechanisms so that the apparatus 200 does not move inadvertently during use.

It is understood that while certain forms of this invention have been illustrated and described, it is not limited thereto except insofar as such limitations are included in the following claims and allowable functional equivalents thereof.

The invention claimed is:

1. A portable tire and wheel lifting apparatus comprising:
    a base having opposed side members;
    a pair of lifting arms pivotally coupled to one another and arranged in a scissor configuration for relative up and down movement, each said lifting arm having a first end and a second opposed end;
    a pair of air cylinders pivotally coupled to respective side members of said base, each air cylinder receiving a corresponding first end of a respective lifting arm for relative movement of said respective lifting arm between retracted and extended configurations;
    means for selectively imparting a stream of air to said pair of air cylinders for moving said lifting arms from said retracted to said extended configuration;
    means for selectively releasing air from said pair of air cylinders for moving said lifting arms from said extended configuration to said retracted configuration;
    wherein said second ends of said lifting arms are configured to support a tire and wheel thereon;
    a pair of rollers rotatably mounted to respective said second ends of said lifting arms for supporting said tire and wheel atop said rollers and in direct contact therewith for allowing said tire and wheel to rotate thereon; and
    a pair of ramp members mounted to respective side members of said base and situated in direct contact upon said base, said pair of ramp members having a configuration for allowing a tire to be rolled smoothly between a ground surface and said second ends of said lifting arms.

2. The apparatus as in claim 1 wherein each said lifting arm includes a lower segment angularly offset from an upper segment.

3. The apparatus as in claim 1 further comprising an air inlet valve in said base and tubing to connect said air cylinders to said air inlet valve.

4. The apparatus as in claim 1 further comprising a plurality of wheels coupled to said base for selective movement of said base along a ground surface.

* * * * *